(12) United States Patent
Kizumoto et al.

(10) Patent No.: US 6,545,119 B2
(45) Date of Patent: Apr. 8, 2003

(54) MAGNETIC RECORDING MEDIA AND THERMOPLASTIC POLYURETHANE RESINS THEREFOR

(75) Inventors: Hirotoshi Kizumoto, Otsu (JP); Takeshi Yatsuka, Otsu (JP); Chikara Sugitawa, Otsu (JP); Kuniyuki Doi, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/520,204

(22) Filed: Mar. 7, 2000

(65) Prior Publication Data

US 2003/0022022 A1 Jan. 30, 2003

(30) Foreign Application Priority Data

| Mar. 8, 1999 | (JP) | ............................................. | 11-060612 |
| Jul. 7, 1999 | (JP) | ............................................. | 11-193270 |
| Jul. 7, 1999 | (JP) | ............................................. | 11-193271 |
| Nov. 1, 1999 | (JP) | ............................................. | 11-311335 |

(51) Int. Cl.$^7$ ............................................. C08G 18/42
(52) U.S. Cl. ............................. 528/71; 528/83; 525/440
(58) Field of Search ....................... 528/83, 71; 525/440

(56) References Cited

U.S. PATENT DOCUMENTS

| 3,015,650 A | * | 1/1962 | Schollenberger |
| 4,568,611 A | | 2/1986 | Amirsakis et al. |
| 5,413,862 A | | 5/1995 | Murata et al. |
| 6,221,468 B1 | * | 4/2001 | Murayama et al. |

FOREIGN PATENT DOCUMENTS

| DE | 43 16 039 A | | 11/1993 |
| EP | 0 464 750 A | | 1/1992 |
| JP | 9-40738 | * | 2/1997 |
| JP | 9 040738 A | | 2/1997 |
| JP | 10 320749 A | | 12/1998 |
| JP | 11 217539 A | | 8/1999 |

* cited by examiner

*Primary Examiner*—Rachel Gorr
(74) *Attorney, Agent, or Firm*—Morrison & Foerster LLP

(57) ABSTRACT

A magnetic recording medium possessing a magnetic layer formed by application onto a non-magnetic support, of a magnetic coating containing magnetic particles dispersed in a binder which contains a polyurethane resin, together with carbon black particles at 5% by weight or higher, based on the weight of the magnetic particles. The polyurethane resin to be used herein is composed of: (a) a polyester polyol having a molecular weight of 2000 or lower and containing at least one selected from the group consisting of aromatic dibasic acids and alicyclic dibasic acids at a ratio of 90 mol % or higher of acid components; (b) a high molecular weight polyol having a molecular weight of 5000 or lower, which is at least one selected from the group consisting of (b1) polyester polyols each containing an aliphatic dibasic acid at a ratio of 90 mol % or higher of acid components, (b2) polylactones, (b3) polyester polyols, and (b4) polycarbonate polyols; (c) an organic diisocyanate compound; and (d) an optional compound having a molecular weight of 500 or lower and containing at least two functional groups in one molecule, which are reactive with isocyanate groups.

1 Claim, No Drawings

MAGNETIC RECORDING MEDIA AND THERMOPLASTIC POLYURETHANE RESINS THEREFOR

FILED OF INVENTION

The present invention relates to magnetic recording media and more particularly it relates to magnetic recording media such as magnetic tapes and magnetic disks, having high durability, high abrasion resistance and high heat resistance, and exhibiting excellent dispersibility and filling ratio of magnetic particles. The present invention further relates to thermoplastic polyurethane resins suitable for use in the magnetic recording media, which are obtained by reaction in molten state of starting materials.

BACKGROUND OF THE INVENTION

The production of general-purpose magnetic recording media such as magnetic tapes and floppy disks has been carried out by application onto a polyethylene terephthalate film as a non-magnetic support, of a magnetic coating containing magnetic particles in needle shape having a lengthwise size of 1 μm or smaller, which are dispersed, together with additives such as dispersants, lubricants, and antistatic agents, in the solution of a binder, to form a magnetic layer.

The binder in the magnetic layer should have various characteristics including high dispersibility, high filling ratio, and high degree of orientation of the magnetic particles, high durability, high abrasion resistance, and high heat resistance of the magnetic layer, and good adhesion of the magnetic layer to the non-magnetic support. The binder plays a very important role.

As the conventional binder, there have been used vinyl chloride-vinyl acetate copolymers, vinyl chloride-vinyl acetate-vinyl alcohol copolymers, vinyl chloride-vinylidene chloride copolymers, polyurethane resins, polyester resins, acrylonitrile-butadiene copolymers, nitrocellulose, cellulose acetate butyrate, epoxy resins, and acrylic resins.

In particular, the polyurethane resins have excellent toughness and excellent abrasion resistance because of their intermolecular hydrogen bonds through urethane bonds as compared with the other resins. It has been well known that the introduction of sulfonic acid metal salt groups into the polyurethane molecules is an effective means of improving the dispersibility of magnetic particles (see JP-A 54-159603).

In recent years, there have been great demands for lowering the price of materials for the production of magnetic tapes or magnetic disks to reduce the cost of the production of general-purpose video tapes or general-purpose floppy disks for public use. In particular, the general-purpose video tapes for public use have a tendency to have thinner magnetic layers to reduce the cost of production. The magnetic tapes having thinner magnetic layers may have their decreased blackness, making it difficult to recognize and detect the leading tape portions at both ends of these magnetic tapes by photosensors provided in tape recorders, and thereby making it impossible to operate auto-stop and other functions.

For this reason, to improve the blackness of magnetic layers made thinner, the amount of carbon black particles to be added has been increased. As disclosed in JP-A 63-103418 and JP-A 59-84339, carbon black particles have been blended so far at ratios of about 3% by weight or lower, based on the weight of magnetic particles. In recent years, however, because of the above problems, it is usual to blend carbon black particles at ratios of at least 5% by weight.

In the system where the amount of carbon black particles blended in the magnetic coating is increased, the viscosity of the magnetic coating may often be increased, making it difficult to disperse magnetic particles. When such a magnetic coating is used to produce magnetic tapes, various problems will occur. For example, the resultant magnetic tapes cannot have satisfactory magnetic characteristics because of the insufficient dispersibility of magnetic particles; the magnetic coating, if it has a remarkably increased viscosity, cannot be applied; the application of the magnetic coating requires prolonged time because of its increased viscosity; and the speed on the application line cannot be raised, thereby lowering the productivity of magnetic tapes.

Even when the amount of carbon black particles to be blended in the magnetic coating is increased, there have been demands for binder resins capable of keeping the sufficient dispersibility of magnetic particles and the low viscosity of magnetic coatings. The conventional binder resins cannot satisfactorily meet these requirements. An object of the present invention is to provide magnetic recording media exhibiting excellent magnetic characteristics by the satisfactory dispersibility of magnetic particles and the low viscosity of magnetic coatings, both of which can be kept even when carbon black particles are blended at higher amounts, ie., at least 5% by weight, based on the weight of magnetic particles.

To meet great demands for lower priced materials of magnetic tapes and magnetic disks, the main type of binder resin as one of the materials is turning from the conventional solution type to the solid type, which is more inexpensive because of its low costs of production and transportation, and typical examples are disclosed in JP-B 58-8053, JP-B 61-231050, and JP-B 3-13648. For further lowering costs and improving performance, magnetic layers have become thinner than ever, so that there arises a need to increase the amount of carbon black particles to be blended in the magnetic layer for decreasing light transmittance, which causes some problems including the lowering of dispersibility and the increased viscosity of magnetic coatings.

The thermoplastic polyurethane resins obtained by reaction in molten state of starting materials are prepared by feeding polyester diols in molten state at a constant flow rate to an extruder and reacting them with the corresponding amounts of isocyanate compounds in molten state. For the quantitative transfer of polyester diols in molten state, they are therefore preferred to have lower melt viscosity. The use of polyester diols having high melt viscosity makes it difficult to feed them at a constant flow rate, so that polyurethane resins of stable quality cannot be obtained.

The polyester diols composed mainly of aromatic dibasic acids are quite useful materials for the design of binder resins having high glass transition temperatures, which are essential to conferring durability on magnetic recording media. It has, however, been difficult to use these polyester diols as the starting materials of solid-type polyurethane resins because of their high melt viscosity.

For increasing the dispersibility of magnetic particles, it is preferred to introduce into polyester diols, polar groups such as sulfonic acid groups or phosphonic acid groups. These polar group-containing polyester diols may, however, have further high melt viscosity.

This results in, for example, broader molecular weight distribution, making it difficult to obtain polyurethane resins of stable quality. Almost all of the polyester diols having low melt viscosity as single components are polyester diols composed mainly of aliphatic dibasic acids.

Therefore, the conventional design of solid-type polyurethane resins having high glass temperatures involves the use of polyester diols composed mainly of aliphatic dibases taking a means of increasing the concentration of urethane bonding groups with aromatic diisocyanate compounds.

However, an increase in the urethane bonding group concentration lowers the solubility of polyurethane resins in general-purpose solvents, and when the polyurethane resins are used in the binders for magnetic recording media, the dispersibility of magnetic particles becomes deteriorated. Thus, there have been demands for solid-type polyurethane resins having high glass transition temperatures and exhibiting high dispersing performance on magnetic particles.

There is another method in which polyester diols containing aromatic dicarboxylic acids and therefore having high melt viscosity are blended with low molecular weight diols or other materials to decrease the melt viscosity; however, when sublimable low molecular diols in solid form at ordinary temperatures are used, they cause sublimation in the mixing tank before feeding to an extruder, which results in a change of the hydroxyl value of diols and the isocyanate value of organic diisocyanate compounds, making it difficult to obtain polyurethane resins of stable quality.

SUMMARY OF THE INVENTION

Under these circumstances, the present inventors have extensively studied to provide magnetic recording media exhibiting excellent magnetic characteristics. As a result, they have found that the use of specific polyurethane resins in binders makes it possible to solve the above problems, thereby completing the present invention.

In one aspect of the present invention, there is provided a magnetic recording medium comprising a magnetic layer formed by application onto a non-magnetic support, of a magnetic coating containing magnetic particles dispersed in a binder which comprises a polyurethane resin, together with 5% by weight or higher carbon black particles, based on the weight of the magnetic particles. The polyurethane resin to be used herein is composed of: (a) a polyester polyol having a molecular weight of 2000 or lower and containing at least one selected from the group consisting of aromatic dibasic acids and alicyclic dibasic acids at a ratio of 90 mol % or higher of acid components; (b) a high molecular weight polyol having a molecular weight of 5000 or lower, which is at least one selected from the group consisting of (b1) polyester polyols each containing an aliphatic dibasic acid at a ratio of 90 mol % or higher of acid components, (b2) polylactones, (b3) polyether polyols, and (b4) polycarbonate polyols; (c) an organic diisocyanate compound; and (d) an optional compound having a molecular weight of 500 or lower and containing at least two functional groups in one molecule, which are reactive with isocyanate groups.

In another aspect of the present invention, there are provided several thermoplastic polyurethane resins suitable for use in the magnetic recording media.

The first thermoplastic polyurethane resin is obtained by reaction in molten state of starting materials, and has a glass transition temperature of 80° C. or higher and an urethane bonding group concentration of lower than 3000 equivalents (eq.)/ton ($10^6$ g).

The second thermoplastic polyurethane resin is obtained by reaction in molten state of a polyester (component A) containing at least one selected from the group consisting of aromatic dicarboxylic acids and alicyclic dicarboxylic acids at a ratio of 80 mol % or higher as an acid component; a low molecular weight diol (component B) having a molecular weight of 500 or lower; and an optional high molecular weight polyol (component C), which is at least one selected from the group consisting of (C1) polyester polyols each composed mainly of an aliphatic dicarboxylic acid as an acid component, (C2) polylactones, (C3) polyether polyols, and (C4) polycarbonate polyols, with an organic diisocyanate compound, in which component A meets at least one of the conditions: (i) 10 to 50 mol % of glycol components comprises 1,6-hexanediol; and (ii) 80 mol % or higher of the acid components comprises at least one dicarboxylic acid selected from the group consisting of isophthalic acid, o-phthalic acid, 1,3-cyclohexanedicarboxylic acid (hydrogenated isophthalic acid), and 1,2-cyclohexanedicarboxylic acid (hydrogenated phthalic acid).

The third thermoplastic urethane resin is obtained by reaction in molten state of a polyester polyol (component A) and a low molecular weight diol (component B) having a molecular weight of 500 or lower with an organic diisocyanate compound, in which component B is at least one selected from the group consisting of diols having a molecular weight of 200 or higher and diols in liquid form at 20° C.

The fourth thermoplastic polyurethane resin is obtained by reaction in molten state of starting materials, and has a molecular weight distribution (Mw/Mn) as determined by a ratio of weight-average molecular weight (Mw) to number-average molecular weight (Mn) of 4 or lower.

DETAILED DESCRIPTION OF THE INVENTION

The magnetic recording media according to the present invention are characterized in that a magnetic layer is formed by application onto a non-magnetic support, of a magnetic coating containing magnetic particles dispersed in a binder which contain a specific polyurethane resin and carbon black particles. For these magnetic recording media, even if the carbon black particles are blended at high ratios in the binder, the use of a specific polyurethane resin in the binder makes it possible to maintain low viscosity of the magnetic coating and high dispersibility of the magnetic particles, resulting in excellent magnetic characteristics.

The polyurethane resin which can be used herein is composed of: (a) a polyester polyol having a molecular weight of 2000 or lower and containing at least one selected from the group consisting of aromatic dibasic acids and alicyclic dibasic acids at a ratio of 90 mol % or higher of acid components; (b) a high molecular weight polyol having a molecular weight of 5000 or lower, which is at least one selected from the group consisting of (b1) polyester polyols each containing an aliphatic dibasic acid at a ratio of 90 mol % or higher of acid components, (b2) polylactones, (b3) polyether polyols, and (b4) polycarbonate polyols, preferably from polyester polyols b1; (c) an organic diisocyanate compound; and (d) an optional compound having a molecular weight of 500 or lower and containing at least two functional groups in one molecule, which are reactive with isocyanate groups.

The acid components of polyester polyols a and b which can be used in the above polyurethane resin may include, but are not limited to, dibasic acids with a basic naphthalene structure, such as 1,5-naphthalic acid and 2,6-naphthalic acid; aromatic dibasic acids such as terephthalic acid, isophthalic acid, o-phthalic acid, 4,4'-diphenyldicarboxylic acid, and 4,4'-diphenyl ether dicarboxylic acid; alicyclic dibasic acids such as 1,4-cyclohexanedicarboxylic acid, 1,3-cyclohexanedicarboxylic acid, 1,2-cyclohexanedicarboxylic acid, and hydrogenated compounds of phthalic anhydride; and aliphatic dibasic acids such as succinic acid, adipic acid, azelaic acid, sebacic acid, and dodecanedicarboxylic acid.

The glycol components may include, but are not limited to, aliphatic glycols such as ethylene glycol, propylene glycol, 1,3-propanediol, 1,4-butanediol, 1,5-pentanediol, and 1,6-hexanediol; 1,2-propylene glycol, 1,3-propylene glycol, 1,3-butylene glycol, 2,3-butylene glycol, 2,2-dimethyl-1,3-propanediol, 3-methyl-1,5-pentanediol, 2,2-dimethyl-3-hydroxypropyl 2',2'-dimethyl-3-hydroxypropanate, 2,2-diethyl-1,3-propanediol, 1,4-bis(hydroxymethyl)cyclohexane, ethylene oxide adducts of bisphenol A, ethylene oxide adducts and propylene oxide adducts of hydrogenated bisphenol A, polyethylene glycol, polypropylene glycol, and polytetramethylene glycol. In part of the starting materials of the polyester diols, there may be used tri- or higher functional compounds such as trimellitic anhydride, glycerin, trimethylolpropane, and pentaerythritol to such an extent that the characteristics of the polyester resin, such as solubility in organic solvents and coating properties, are not deteriorated.

The other dicarboxylic acid components and glycol components of the aromatic polyester diols may include, but are not limited to, those containing a sulfonic acid metal salt group, such as 5-sulfo-isophthalic acid sodium salt, 5-sulfo-isophthalic acid potassium salt, 2-sulfo-terephthalic acid sodium salt, 2-sulfo-1,4-butanediol sodium salt, and 2,5-dimethyl-3-sulfo-2,5-hexanediol sodium salt. The sulfonic acid metal salt group has an effect of remarkably improving the dispersibility of inorganic particles such as magnetic particles, abrasive materials, and carbon black particles.

Instead of polyester polyol b1, there may be used polylactone polyols b2 such as polycaprolactone and polyvalerolactone; polyether polyols b3 such as polyethylene glycol, polypropylene glycol, and polytetramethylene glycol; and polycarbonate polyols b4 derived from 1,6-hexanediol, neopentyl glycol, and cyclohexanedimethanol.

The polyurethane resin which can be used in the magnetic recording media of the present invention can be obtained by various methods including solution polymerization, melt polymerization, and solid phase polymerization. From an economical point of view, for example, recently requesting low prices of raw materials for general-purpose magnetic tapes, methods by melt polymerization are preferred.

The polyester polyol a which can be used in the above polyurethane resin should have a molecular weight of 2000 or lower, preferably 1000 or lower. When the molecular weight is higher than 2000, the polyester polyol has increased melt viscosity, which often makes difficult stable introduction into a reaction vessel at the time of melt polymerization. For the same reason, high molecular weight polyol b, i.e., polyester polyol b1, polylactone b2, polyether polyol b3, and polycarbonate polyol b4, should have a molecular weight of 5000 or lower, preferably 3000 or lower.

The weight ratio of polyester polyols a and b for copolymerization in the above polyurethane resin is preferably in the range of 30:70 to 70:30 because higher dispersibility of the magnetic particles and lower viscosity of the magnetic coating can be kept, even when 5% by weight or higher carbon black particles, based on the weight of the magnetic particles, are blended in the binder.

The polyester polyol a contains at least one selected from the group consisting of aromatic dibasic acids and alicyclic dibasic acids at a ratio of 90 mol % or higher of acid components, and the polyester polyol b contains an aliphatic dibasic acid at a ratio of 90 mol % or higher of acid components because higher dispersibility of the magnetic particles and lower viscosity of the magnetic coating can be kept, even when 5% by weight or higher carbon black particles, based on the weight of the magnetic particles, are blended in the binder.

The organic diisocyanate compound c which can be used in the preparation of the above polyurethane resin may include, but are not limited to, 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,6-naphthalene diisocyanate, 3,3'-dimethyl-4,4'-biphenylene diisocyanate,4,4'-diphenylene diisocyanate, 4,4'-diisocyanate diphenyl ether, 1,5-naphthalene diisocyanate, m-xylene diisocyanate, 1,3-diisocyanate methylcyclohexane, 1,4-diisocyanate methylcyclohexane, 4,4'-diisocyanate cyclohexane, 4,4'-diisocyanate cyclohexylmethane, and isophorone diisocyanate.

In the preparation of the above polyurethane resin, low molecular weight compound d may optionally be used, having a molecular weight of 500 or lower, preferably 300 or lower, and containing at least two functional groups in one molecule, which are reactive with isocyanate groups. The low molecular weight compound d can be used to adjust the urethane bonding group concentration of the polyurethane resin. The low molecular weight compound d containing at least three functional groups in one molecule, which are reactive with isocyanate groups, is useful for the improvement of reactivity with general-purpose hardening agents.

Specific examples of the low molecular weight compound d are, but not limited to, straight chain glycols such as ethylene glycol, 1,3-propylene glycol, 1,6-hexanediol, cyclohexanedimethanol, xylylene glycol, diethylene glycol, triethylene glycol, and ethylene oxide adducts of bisphenol A; branched glycols such as propylene glycol, neopentyl glycol, 1,2-butanediol, 1,3-butanediol, 2,2,4-trimethyl-1,3-pentanediol, and propylene oxide adducts of bisphenol A; amino alcohols such as N-methylethanolamine, monoethanolamine, and diethanolamine; polyols such as trimethylolpropane, glycerin, pentaerythritol, and dipentaerythritol; and ε-caprolactone adducts of one of these polyols.

The polyurethane resin which can be used in the magnetic recording media of the present invention may preferably have a molecular weight of 5000 to 80000, more preferably 10000 to 40000, because the solution viscosity of the magnetic coating will become suitable for excellent coating properties and high dispersibility of inorganic particles such as magnetic particles, abrasives, and carbon black particles, so that the resultant magnetic recording media can have high mechanical strength and high traveling durability.

As a reaction catalyst, there may be used, for example, stannous octoate, dibutyltin dilaurate, or triethylamine.

Furthermore, various additives including ultraviolet light absorbers, hydrolysis inhibitors, and oxidation inhibitors may be added before, during, or after the preparation of the polyurethane resin.

In the production of magnetic recording media of the present invention, additional resins, and/or compounds crosslinkable by reaction with the polyurethane resin, may be added to the binder for the purpose of adjusting the flexibility of the magnetic recording media and improving their brittle resistance at low temperatures and durability. The additional resins may include, but are not limited to, vinyl chloride resins, polyester resins, cellulose resins, epoxy resins, phenoxy resins, polyvinyl butyral, and acrylonitrile-butadiene copolymers. The compounds crosslinkable by reaction with the polyurethane resin may include, but are not limited to, polyisocyanate compounds, epoxy resins, and urea resins, in which polyisocyanate compounds are particularly preferred.

The magnetic particles which can be used in the magnetic layer of the magnetic recording media of the present invention may be made of ferromagnetic materials including, but not limited to, $\gamma\text{-Fe}_2\text{O}_3$, crystals of $\gamma\text{Fe}_2\text{O}_3$ and $\text{Fe}_3\text{O}_4$, $\text{CrO}_2$, cobalt-coated $\gamma\text{-Fe}_2\text{O}_3$ and $\text{Fe}_3\text{O}_4$, barium ferrite, ferromagnetic alloy such as Fe—Co and Fe—Co—Ni, and purified iron.

In the production of the magnetic recording media of the present invention, there may optionally be added various additives to the magnetic coating, including plasticizers such as dibutyl phthalate and triphenyl phosphate; lubricants such as dioctyl sodium sulfosuccinate, t-butylphenol polyethylene ether, sodium ethylnaphthalene sulfonate, dilauryl succinate, zinc stearate, soybean oil lecithin, and silicone oil, and various antistatic agents.

The magnetic recording media of the present invention may further comprises a back coat layer formed on the back of a non-magnetic support. The back coat layer may contain inorganic fine particles including inorganic lubricants such as calcium carbonate, magnesium carbonate, aluminum oxide, chromium dioxide, silicon dioxide, and titanium oxide; and antistatic agents such as carbon black and tin oxide.

The present invention further provides various thermoplastic polyurethane resins suitable for use in the magnetic recording media.

The first thermoplastic polyurethane resin is obtained by reaction in molten state of starting materials, and has a glass transition temperature of 80° C. or higher and an urethane bonding group concentration of lower than 3000 eq./$10^6$ g.

The second thermoplastic polyurethane resin is obtained by reaction in molten state of a polyester (component A) containing at least one selected from the group consisting of aromatic dicarboxylic acids and alicyclic dicarboxylic acids at a ratio of 80 mol % or higher as an acid component; a low molecular weight diol (component B) having a molecular weight of 500 or lower; and an optional polyester (component C), which is at least one selected from the group consisting of (C1) polyester polyols each composed mainly of an aliphatic dicarboxylic acid as an acid component, (C2) polylactones, (C3) polyether polyols, and (C4) polycarbonate polyols, with an organic diisocyanate compound, in which component A meets at least one of the conditions: (i) 10 to 50 mol % of glycol components comprises 1,6-hexanediol; and (ii) 80 mol % or higher of the acid components comprises at least one dicarboxylic acid selected from the group consisting of isophthalic acid, o-phthalic acid, 1,3-cyclohexanedicarboxylic acid (hydrogenated isophthalic acid), and 1,2-cyclohexanedicarboxylic acid (hydrogenated phthalic acid).

The third thermoplastic urethane resin is obtained by reaction in molten state of a polyester polyol (component A) and a low molecular weight diol (component B) having a molecular weight of 500 or lower with an organic diisocyanate compound, in which component B is at least one selected from the group consisting of diols having a molecular weight of 200 or higher and diols in liquid form at 20° C.

The fourth thermoplastic polyurethane resin is obtained by reaction in molten state of starting materials, and has a molecular weight distribution (Mw/Mn) as determined by a ratio of weight-average molecular weight (Mw) to number-average molecular weight (Mn) of 4 or lower.

As described above, conventional efforts to improve the durability of magnetic recording media were directed to the increase in glass transition temperature of polyurethane resins used therein; however, for polyurethane resins obtained by reaction in molten state of starting materials, higher amounts of aromatic dicarboxylic acids to attain the increased glass transition temperature will increase the melt viscosity, and higher amounts of aliphatic dicarboxylic acids to decrease the melt viscosity will cause a necessity to increase the urethane bonding group concentration to attain the increased glass transition temperature, in which case such conventional polyurethane resins obtained by reaction in molten state of starting materials give no magnetic recording media which meet all the requirements including high dispersibility of inorganic particles, high durability over a wide range of temperatures, and excellent magnetic recording characteristics. The first to fourth thermoplastic polyurethane resins of the present invention, which can solve these problems, are therefore suitable for use in binders for low-priced, mass-produced magnetic recording media.

More particularly, the above problems can be solved by thermoplastic polyurethane resins having a glass transition temperature of 80° C. or higher and an urethane bonding group concentration of lower than 3000 eq./$10^6$ g.

The first thermoplastic polyurethane resin may preferably include the second to the fourth thermoplastic polyurethane resins.

The acid components of a polyester (component A) composed mainly of aromatic dicarboxylic acids and/or alicyclic dicarboxylic acids, which can be used in the second thermoplastic polyurethane resin, may be the same as those of polyester polyols a and b in the above magnetic recording media of the present invention. From these dicarboxylic acid components, aromatic dicarboxylic acids and/or alicyclic dicarboxylic acids are selected at ratios of 80 mol % or higher, preferably 90 mol % or higher. For decreasing the melt viscosity of the polyester (component A), there may preferably be used isophthalic acid, o-phthalic acid, phthalic anhydride, 1,3-cyclohexanedicarboxylic acid (hydrogenated isophthalic acid), and 1,2-cyclohexanedicarboxylic acid (hydrogenated o-phthalic acid or its anhydride). The contents of these dicarboxylic acids are preferably 80 mol % or higher, more preferably 90 mol % or higher, of the dicarboxylic acid components.

The glycol components of a polyester (component A) composed mainly of aromatic dicarboxylic acids and/or alicyclic dicarboxylic acids, which can be used in the second thermoplastic polyurethane resin, may be the same as those of polyester polyols a and b in the above magnetic recording media of the present invention. The use of straight chain aliphatic diols containing 5 to 12 carbon atoms, particularly 1,6-hexanediol, is preferred for decreasing the melt viscosity of the polyester (component A). The copolymerization including 1,6-hexanediol at a ratio of 10 mol % or higher has a remarkable effect of decreasing the melt viscosity. When the amount of 1,6-hexanediol to be copolymerized is 50 mol % or lower, various merits of the polyurethane resin, including the dispersibility of magnetic particles capable of being kept at high levels, even when carbon black particles are blended at higher concentrations, and the high glass transition temperature capable of being kept, can be exhibited in binders for magnetic recording media.

The branched glycols as described above improve the solubility of the second thermoplastic polyurethane resin, making a contribution as the resin used in a binder for magnetic recording media to the improvement of dispersibility of magnetic particles. The alicyclic glycols as described above have an effect of improving the glass transition temperature of the second thermoplastic urethane resin.

The dicarboxylic acid components and glycol components other than the above may include, but are not limited to, those containing a sulfonic acid metal salt group, such as 5-sulfo-isophthalic acid sodium salt, 5-sulfo-isophthalic acid potassium salt, 2-sulfo-terephthalic acid sodium salt, 2-sulfo-1,4-butanediol sodium salt, and 2,5-dimethyl-3-sulfo-2,5-hexanediol sodium salt. The sulfonic acid metal salt group has an effect of remarkably improving the dispersibility of inorganic particles such as magnetic particles, abrasive materials, and carbon black particles.

The polyester (component A) may preferably contain a sulfonic acid metal salt group at an amount of 10 to 400 eq./$10^6$ g, more preferably 40 to 200 eq./$10^6$ g. Amounts smaller than 10 eq./$10^6$ g will cause poor dispersion of magnetic particles, whereas amounts greater than 400 eq./$10^6$ g may often lead to an increased viscosity of polyurethane resin solutions or magnetic coatings, making many troubles in the handling of these solutions or coatings or in the production of magnetic recording media.

In general, the presence of sulfonic acid metal salt groups will cause a remarkable increase of the melt viscosity of the polyester (component A); however, polyesters having a high sulfonic acid metal salt group concentration can be used as starting materials by selecting appropriate dicarboxylic acid components and glycol components of the polyesters (component A) and by putting into a reaction vessel a mixture of the polyesters (component A) and low molecular weight diols (component B).

The polyester polyol (component A) which can be used in the third thermoplastic polyurethane resin of the present invention is not particularly limited, but it may preferably be the same as the polyester (component A) described above, which can be used in the second thermoplastic polyurethane resin of the present invention.

The polyester and polyester polyol (component A) which can be used in the second and the third thermoplastic polyurethane resins, respectively, of the present invention may preferably have a molecular weight of 2000 or lower, more preferably 1000 or lower. When the molecular weight is higher than 2000, the polyester and polyester polyol (component A) will have an increased melt viscosity, making it difficult to feed the starting materials into an extruder, even if the low molecular weight diol (component B) is mixed in molten state.

The low molecular weight diol (component B) having a molecular weight of 500 or lower, contained in the second and the third thermoplastic polyurethane resins of the present invention, is used by addition in molten state to decrease the melt viscosity of the polyester or polyester polyol (component A). As the low molecular weight diol (component B), there may be used those recited as the glycol components of polyester polyol a and b in the above magnetic recording media of the present invention.

However, when the polyester or polyester polyol (component A) and the low molecular weight diol (component B) are stored in a tank for feeding them in admixture into an extruder, the low molecular weight diol will cause volatilization. When the low molecular weight diol has high volatility and is in solid form at ambient temperature, it has a tendency to adhere to the inner wall at the top of the tank, thereby causing a change in the ratio of the polyester or polyester diol (component A) and the low molecular weight diol (component B), which makes impossible stable production of thermoplastic polyurethane resins. To solve this problem, the low molecular weight diol (component B) may preferably be selected from the group consisting of diols having a molecular weight of 200 or higher or diols in liquid form at 20° C.

The diols having a molecular weight of 200 or higher may include, but are not limited to, neopentyl hydroxypivalate, adducts of bisphenol A with ethylene oxide or propylene oxide, adducts of hydrogenated bisphenol A with ethylene oxide or propylene oxide, and polypropylene glycol. The diols in liquid form at 20° C. may include, but are not limited to, ethylene glycol, propylene glycol, 1,3-propanediol, 1,2-butanediol, 1,4-butanediol, 2-methyl-1,3-propanediol, 1,5-pentanediol, 3-methyl-1,5-pentanediol, diethylene glycol, and dipropylene glycol. In particular, neopentyl hydroxypivalate, 2,2,4-trimethyl-1,3-pentanediol, 1,4-butanediol, and 2-methyl-1,3-propanediol are preferred.

The low molecular weight diol (component B) contained in the second and the third thermoplastic polyurethane resins of the present invention may preferably have a molecular weight of 300 or lower. When the molecular weight is higher than 300, there can be obtained in mixing the polyester or polyester polyol (component A) and the low molecular weight diol (component B), no effect of decreasing the melt viscosity of the mixture. The low molecular weight diol (component B) is not limited to one kind of compound, but may be effective, even in a mixture of two or more kinds of compounds.

Furthermore, as the starting material of the second thermoplastic polyurethane resin of the present invention, there may optionally be used a high molecular weight polyol (component C), which is at least one selected from the group consisting of (C1) polyester polyols each composed mainly of an aliphatic dicarboxylic acid as an acid component, (C2) polylactones, (C3) polyester polyols, and (C4) polycarbonate polyols, preferably from polyester polyols C1.

The organic diisocyanate compound which can be used in the preparation of the first to fourth thermoplastic polyurethane resins of the present invention may include, but are not limited to, 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,6-naphthalene diisocyanate, 3,3'-dimethyl-4,4'-biphenylene diisocyanate,4,4'-diphenylene diisocyanate, 4,4'-diisocyanate diphenyl ether, 1,5-naphthalene diisocyanate, 1,3-diisocyanate methylcyclohexane, 1,4-diisocyanate methylcyclohexane, 4,4'-diisocyanate cyclohexane, 4,4'-diisocyanate cyclohexylmethane, and isophorone diisocyanate.

The first to fourth thermoplastic polyurethane resins of the present invention can be obtained by various methods including solution polymerization, melt polymerization, and solid phase polymerization. From an economical point of view, for example, recently requesting low prices of raw materials for general-purpose magnetic tapes, methods by melt polymerization are preferred.

The first to fourth thermoplastic polyurethane resins of the present invention may preferably have a molecular weight of 5000 to 80000, more preferably 10000 to 40000. When the molecular weight is lower than 5000, these thermoplastic polyurethane resins will have poor mechanical strength, thereby causing a deterioration of the traveling durability of magnetic tapes or other recording media. When the molecular weight is higher than 80000, the viscosity of binders containing these thermoplastic polyurethane resins will become high, thereby causing a deterioration of the working properties in the preparation of a magnetic coating and the dispersibility of magnetic particles, abrasives, and carbon black particles in the magnetic coating.

The first to fourth thermoplastic polyurethane resins of the present invention may preferably have a molecular weight distribution (Mw/Mn) as determined by a ratio of weight-average molecular weight (Mw) to number-average molecular weight (Mn) of 4 or lower, more preferably 3 or lower, and still more preferably 2.5 or lower. When thermoplastic polyurethane resins having glass transition temperatures of 80° C. or higher for use in magnetic recording media are prepared in molten state, it is necessary to use polyester polyols containing aromatic dicarboxylic acids at ratios of 80 mol % or higher as the starting materials, so that their melt viscosity will become increased too much and the amount of starting materials to be put into an extrude will not be kept constant, thereby broadening the molecular weight distribution of the polyurethane resins obtained. However, thermoplastic polyurethane resins having narrow molecular weight distributions can be obtained by melt reaction, for example, when polyesters or polyester polyols (component A) as the starting materials are selected from those containing the acid components and the glycol components as recited above for the second thermoplastic polyurethane resin of the present invention, and these polyesters or polyester polyols (component A) are used together with the low molecular weight diols (component B) as recited above for the third thermoplastic polyurethane resin of the present invention.

According to the present invention, it becomes possible to prepare polyester polyurethanes containing aromatic dicarboxylic acids as the main acid components and having low concentrations of urethane bonding groups by substituting polyesters or polyester polyols (component A) containing specific dicarboxylic acid components and specific glycol components to decrease the melt viscosity for the conventional aromatic polyester diols, which have high melt viscosity and have therefore been considered unsuitable for the starting materials of solid-type polyurethane resins obtained by reaction in molten state; and by blending in molten state with low molecular weight diols (component B) to further decrease the melt viscosity, before feeding as the starting materials of solid-type polyurethane resins to an extruder. The polyurethane resins thus obtained are composed mainly of aromatic and/or alicyclic polyester polyols and have both high glass transition temperatures and good solubility in general-purpose solvents such as toluene, methyl ethyl ketone, and cyclohexane. Furthermore, the aromatic and/or alicyclic polyester polyols can rapidly make a homogenous mixture with the other starting materials because of their low melt viscosity and the resultant mixture can stably be fed to an extruder to attain a narrow molecular weight distribution. Therefore, when the first to fourth thermoplastic polyurethane resins of the present invention are used in the binders for magnetic recording media, the dispersibility of magnetic particles and carbon black particles in the binders as well as the durability of the magnetic recording media can be improved.

The preparation of thermoplastic polyurethane resins having an urethane bonding group concentration of 3000 eq./$10^6$ g or lower and a glass transition temperature of 80° C. or higher has been difficult so far to carry out by melt polymerization. In addition, the preparation of thermoplastic polyurethane resins having a narrow molecular weight distribution has also been difficult so far to carry out by melt polymerization. The present invention makes possible the preparation of such thermoplastic polyurethane resins by using specific polyesters or polyester polyols as starting materials and by blending in molten state with low molecular weight diols. The use of such thermoplastic polyurethane resins in binders for magnetic recording media gives magnetic recording media having both high dispersibility of magnetic particles and high durability, and reduces the cost of production by lowering the price of binder resins as one of the main materials of magnetic recording media.

EXAMPLES

The present invention will hereinafter be further illustrated by some examples; however, the present invention is not limited to these examples. Unless otherwise indicated, parts are by weight.

First, the following Preparation Examples 1–6 for Polyester Polyols a, Preparation Examples 1–4 for Polyester Polyols b1, and Preparation Examples 1–9 for Polyurethane Resins, Examples 1–6, and Comparative Examples 1–3 will demonstrate the magnetic recording media of the present invention.

Preparation Example 1 for Polyester Polyol a

Into a reaction vessel equipped with a thermometer, a stirrer, and a Liebig condenser were charged 315 parts of isophthalic acid, 30 parts of dimethyl sodium 5-sulfoisophthalate, 270 parts of neopentyl glycol, and 87 parts of ethylene glycol, and 0.2 part of tetrabutyl titanate was added as a catalyst. The reaction was allowed to proceed at 180° C. to 220° C. for 4 hours, while the formed water and methanol were removed by distillation. While the formed glycol components were removed by distillation at 240° C. under reduced pressure, the reaction was then allowed to proceed for another about 20 minutes. Polyester polyol 1-A thus obtained had a molecular weight of 2000 and an acid value of 5 eq./$10^6$ g.

Preparation Examples 2–6 for Polyester Polyols a

In the same manner as described above in Preparation Example 1 for Polyester Polyol a, polyester polyols 1-B to 1-F were prepared and shown together with polyester polyol 1-A in Table 1. Polyester polyols 1-E and 1-F contain adipic acid at ratios of 20 mol % and 40 mol %, respectively, in the acid components to be copolymerized, and these polyester polyols were considered as comparative examples which contains aromatic dibasic acids and/or alicyclic dibasic acids at ratios of lower than 90 mol % in the acid components.

Preparation Example 1 for Polyester Polyol b1

Into a reaction vessel equipped with a thermometer, a stirrer, and a Liebig condenser were charged 292 parts of adipic acid, 109 parts of neopentyl glycol, and 230 parts of 1,6-hexanediol, and 0.2 part of tetrabutyl titanate was added as a catalyst. The reaction was allowed to proceed at 180° C. to 220° C. for 3 hours, while the formed water and methanol were removed by distillation. While the formed glycol components were removed by distillation at 230° C. under reduced pressure, the reaction was then allowed to proceed for another 30 minutes. Polyester polyol 1-G thus obtained had a molecular weight of 2000 and an acid value of 3.0 eq./$10^6$ g.

Preparation Examples 2–4 for Polyester Polyols b1

In the same manner as described above in Preparation Example 1 for Polyester Polyol b1, polyester polyols 1-H to 1-K were prepared and shown together with polyester polyol 1-G in Table 1. Polyester polyol 1-J contains adipic acid at a ratio of 35 mol % in the acid components to be copolymerized, and this polyester polyol was considered as a comparative example which contains aliphatic dibasic acids at a ratio of lower than 90 mol % in the acid components.

hydroxypropyl 2',2'-dimethyl-3-hydroxypropanate, and stirring was carried out to give a homogenous solution. The reaction vessel was further charged with 54 g of 4,4'-diphenylmethane diisocyanate, to which 0.05 g of dibutyltin laurate was then added, and the reaction was allowed to proceed at 75° C. for 2 hours. The reaction vessel was further charged with 232 g of methyl ethyl ketone and 232 g of toluene, and the reaction was further allowed to proceed for 3 hours to give polyurethane resin PU1-1.

TABLE 1

| | Polyols | Polyester polyols a | | | | | | Polyols b | | | | |
|---|---|---|---|---|---|---|---|---|---|---|---|---|
| | | 1-A | 1-B | 1-C | 1-D | 1-E | 1-F | 1-G | 1-H | 1-I | 1-J | 1-K | 1-L |
| Acid compo- nents | TPA | | | | 20 | 50 | 30 | | | | 35 | *1) | **2) |
| | IPA | 97 | 50 | | 50 | 27 | 28.5 | | | | | | |
| | OPA | | 50 | 96 | | | | | | | | | |
| | DSN | 3 | | 4 | 3 | 3 | 1.5 | | | 3 | | | |
| | HTPH | | | | 20 | | | | | | | | |
| | AA | | | | | 20 | 40 | 100 | 100 | | | | |
| | SA | | | | 7 | | | | | 97 | 65 | | |
| Glycol compo- nents | EG | 30 | 30 | | 20 | 40 | 40 | | | 30 | 50 | | |
| | BD | | | | | | | | 100 | | | | |
| | HD | | | 25 | | | | 70 | | | | | |
| | NPG | 70 | 50 | 50 | 60 | 60 | 60 | 30 | | 70 | 50 | | |
| | CHDM | | 20 | 25 | 20 | | | | | | | | |
| Mol. weight (Mn) | | 2000 | 1500 | 700 | 600 | 600 | 1000 | 4000 | 2000 | 1500 | 800 | 2000 | 1200 |

*1) Polycaprolactone ("Placsel P-220", Daicel Chemical Industries, Ltd.)
**2) Polypropylene glycol ("Sannix Diol PP-1200", Sanyo Chemical Industries, Ltd.)

For polyol b, polycaprolactone having a molecular weight of 2000 ("Placsel P-220", Daicel Chemical Industries, Ltd.) and polypropylene glycol having a molecular weight of 1200 ("Sannix Diol PP-1200", Sanyo Chemical Industries, Ltd.) were used as polyols 1-K and 1-L, respectively.

For the number-average molecular weight of polyester polyols, the standard polystyrene-reduced values were determined by gel permeation chromatography (model 150C, Waters Corp.) using tetrahydrofuran as a solvent. The compositions of polyester polyols were analyzed by 200 MHz $^1$H NMR spectroscopy.

Preparation Examples 2–9 for Polyurethane Resins

In the same manner as described above in Preparation Example 1 for Polyurethane Resin, polyurethane resins PU1-2 to PU1-9 were prepared. The compositions and molecular weights of the polyurethane resins obtained are shown together with those of polyurethane resin PU1-1 in Table 2.

Polyurethane resins PU1-6 and PU1-7 are comparative examples in which the acid components of polyester polyols a are outside the scope of the present invention. Polyurethane resin PU1-8 is also a comparative example in which the acid components of polyol b are outside the scope of the present invention.

TABLE 2

| | Polyurethane resins | | | | | | | | |
|---|---|---|---|---|---|---|---|---|---|
| | PU1-1 | PU1-2 | PU1-3 | PU1-4 | PU1-5 | PU1-6 | PU1-7 | PU1-8 | PU1-9 |
| Polyester polyol a | 1-A | 1-B | 1-C | 1-D | 1-C | 1-E | 1-F | 1-A | 1-A |
| | 55 | 35 | 60 | 62 | 65 | 55 | 100 | 55 | 80 |
| Polyol b | 1-K | 1-I | 1-H | 1-G | 1-L | 1-H | — | 1-J | 1-G |
| | 45 | 65 | 40 | 38 | 35 | 45 | — | 45 | 20 |
| Organic diisocyanate compound c | MDI | MDI | MDI | MDI | MDI | MDI | MDI | MDI | MDI |
| | 27.0 | 26.0 | 37.5 | 35.5 | 30.0 | 39.8 | 30.0 | 30.1 | 11.5 |
| Chain extender d | HPN | HPN | HPN | DMH | — | NPG | BD | HPN | — |
| | 12 | 8 | 10 | 5 | — | 5 | 2 | 8 | — |
| Mol. weight (Mn) | 32000 | 28000 | 25000 | 30000 | 24000 | 27000 | 25000 | 28000 | 24000 |

Preparation Example 1 for Polyurethane Resin

Into a reaction vessel equipped with a thermometer, a condenser, and a stirring rod were charged 92 g of methyl ethyl ketone, 92 g of toluene, 110 g of polyester polyol 1-A, 90 g of polyol 1-K and 24 g of 2,2-dimethyl-3-

The abbreviations used herein and throughout the specification have the following meanings.

OPA: o-phthalic acid
IPA: isophthalic acid
TPA: terephthalic acid

DSN: dimethyl sodium 5-sulfoisophthalate
HTPA: 1,4-cyclohexanedicarboxylic acid
SA: sebacic acid
AA: adipic acid
NPG: 2,2-dimethyl-1,3-propanediol
DMH: 2-butyl-2-ethyl-1,3-propnediol
HPN: 2,2-dimethyl-3-hydroxypropyl 2',2'-dimethyl-3-hydroxypropanate
CHDM: 1,4-bis(hydroxymethyl)cyclohexane
HD: 1,6-hexanediol
BD: 1,4-butanediol
PG: 1,2-propylene glycol
EG: ethylene glycol
MDI: 4,4'-diphenylmethane diisocyanate For the number-average molecular weight of the polyurethane resins, the standard polystyrene-reduced values were determined by gel permeation chromatography (model 150C, Waters Corp.) using tetrahydrofuran as a solvent.

Example 1

The composition at the mixing ratio as described below was placed in a ball mill and dispersion was carried out for 48 hours, after which 1 part of stearic acid and 1 part of butyl stearate as lubricants, and 6 parts of an isocyanate compound, Coronate L (Nippon Polyurethane Industry Co., Ltd.) as a hardening agent were added, and dispersion was continued for another 1 hour to give a magnetic coating. The magnetic coating thus obtained was applied onto a polyethylene terephthalate film having a thickness of 12 μm in the magnetic field of 2000 gauss so that the thickness after drying of the magnetic layer came to 4 μm. After aging at 50° C. for 48 hours, the gloss of the surface of the magnetic layer was measured. The magnetic coating was measured for viscosity at 25° C. using a type E viscometer at 20 rpm. The results are shown in Table 3.

| | |
|---|---|
| 30% solution of polyurethane resin PU1-1 | 50 parts |
| MAG 527* | 50 parts |
| Cobalt magnetite** | 120 parts |
| Alumina powder (mean particle diameter, 0.2 μm) | 5 parts |
| Raven 1255*** | 24 parts |
| Cyclohexane | 100 parts |
| Methyl ethyl ketone | 50 parts |
| Toluene | 50 parts |

*30% solution of vinyl chloride copolymer resin (UCC Corp.) in a mixture of methyl ethyl ketone and toluene (50:50)
**AN 170HC (Toda Kogyo Corp.)
***Carbon black (Colombian Carbon Corp.)

Examples 2–6

The same experiment was repeated as described above in Example 1, except that polyurethane resin PU1-1 was replaced with polyurethane resins PU1-2 to PU1-5 and PU1-9, respectively. The gloss of the surface of each magnetic layer and the viscosity of each magnetic coating were measured in the same manner as described above in Example 1. The results are shown in Table 3.

Comparative Examples 1–3

The same experiment was repeated as described above in Example 1, except that polyurethane resin PU1-1 was replaced with polyurethane resins PU1-6 to PU1-8, respectively. The gloss of the surface of each magnetic layer and the viscosity of each magnetic coating were measured in the same manner as described above in Example 1. The results are shown in Table 3.

TABLE 3

| | Examples | | | | | | Comparative Examples | | |
|---|---|---|---|---|---|---|---|---|---|
| | 1 | 2 | 3 | 4 | 5 | 6 | 1 | 2 | 3 |
| | Polyurethane resins | | | | | | | | |
| | PU1-1 | PU1-2 | PU1-3 | PU1-4 | PU1-5 | PU1-9 | PU1-6 | PU1-7 | PU1-8 |
| Gloss of magnetic layer surface (%) | 98 | 95 | 102 | 99 | 101 | 92 | 78 | 68 | 74 |
| Viscosity of magnetic coating (poise, 25° C.) | 98 | 102 | 85 | 92 | 68 | 155 | 255 | 320 | 192 |

The following Preparation Examples for Thermoplastic Polyurethane Resins PU2-1 to PU2-2 and Examples 7–9 will demonstrate the first thermoplastic polyurethane resin of the present invention.

For the number-average molecular weight of the polyurethane resins, the standard polystyrene-reduced values were determined by gel permeation chromatography (model 150C, Waters Corp.) using tetrahydrofuran as a solvent. For the glass transition temperature (Tg), the temperature at the peak of loss elastic modulus (E") was determined as Tg from the measurement results of temperature dependence of dynamic viscoelasticity. The measurement was carried out by FT Rheospectoler DVE-AV (Rheology Corp.) at a frequency of 110 Hz and an amplitude of 10.0 μm under the temperature rise conditions of 4° C./min., and the sample pieces were cut into a size of 15 mm×4 mm and a thickness of 25 μm. For the gloss of the magnetic layer of a magnetic tape, 60° gloss was measured. For the squareness ratio of the magnetic layer, the squareness ratio in the direction vertical to the direction of application using a vibrating sample-type magnetometer (model BHV-50, Riken Denshi Co., Ltd.). For the abrasion resistance of the magnetic layer, the magnetic tape was loaded into a commercially available S-VHS video rape deck, and the damage on the magnetic layer after travel repeated 100 times at a traveling temperature of 40° C. was observed and rated at the following 6 levels.

6: almost no damage

5: slight damage

4: rather remarkable damage

3: remarkable damage, not reaching to the polyethylene terephthalate film as a non-magnetic support 2: remarkable damage, through which a small part of the polyethylene terephthalate film as a non-magnetic support can be seen 1: remarkable damage, through which a large part of the polyethylene terephthalate film as a non-magnetic support can be seen These methods were also used for the evaluation of some examples of the second to fourth thermoplastic polyurethane resins and magnetic tapes obtained as described below.

Preparation Example for Thermoplastic Polyurethane Resin PU2-1

From the starting materials as described below, the polyester diol and the low molecular weight diol in molten state were introduced into a twin-screw extruder, and then reacted with the organic polyisocyanate compound. The polyurethane resin in molten state was extruded from the nozzle into a strand form, followed by cooling and subsequent cutting into pellets of solid-type polyurethane resin PU2-1. The characteristics of the resin are shown in Table 4.

(Starting Materials for Polyurethane Resin PU2-1)

Polyester diol

Composition (mole ratio)

| Acid components: | isophthalic acid | 44 |
|---|---|---|
|  | o-phthalic acid | 54 |
|  | 5-sulfophtharic acid sodium salt | 2 |
| Glycol components: | neopentyl glycol | 40 |
|  | 1,4-cyclohexanedimethanol | 20 |
|  | 1,6-hexanediol | 40 |

Hydroxyl value (KOH mg/g): 160

Acid value (KOH mg/g): 0.50

Low molecular weight diol 2,2-dimethyl-3-hydroxypropyl 2',2'-dimethyl-3'-hydroxypropanate Mixing ratio of polyester diol/low molecular weight diol: 100/25 (weight ratio)

Melt viscosity of polyester diol/low molecular weight diol mixture (poise, 90° C.): 6

Organic polyisocyanate compound 4,4'-diphenylmethane diisocyanate

Reaction ratio isocyanate equivalent/total hydroxyl equivalent: 0.95

(Reaction Conditions)

Reaction temperature in the extruder: 170° C.

Twin-screw rotational speed: 260 rpm

Preparation Example for Thermoplastic Polyurethane Resin PU2-2

From the following starting materials, the polyester diol and the low molecular weight diol in molten state were introduced into a twin-screw extruder, and reacted with the organic polyisocyanate. The polyurethane resin in molten state was extruded from the nozzle into a strand form, and then cut, after cooling, into pellets of solid-type polyurethane resin PU2-2. The characteristics of the resin are shown in Table 4.

(Starting Materials for Polyurethane Resin PU2-2)

Polyester diol

Composition (mole ratio)

| Acid components: | o-phthalic acid | 96 |
|---|---|---|
|  | 5-sulfophtharic acid sodium salt | 4 |
| Glycol components: | neopentyl glycol | 60 |
|  | 1,4-cyclohexanedimethanol | 20 |
|  | 1,6-hexanediol | 40 |

Hydroxyl value (KOH mg/g): 186

Acid value (KOH mg/g): 0.39

Low molecular weight diol 2,2-dimethyl-3-hydroxypropyl 2',2'-dimethyl-3'-hydroxypropanate Mixing ratio of polyester diol/low molecular weight diol: 100/20 (weight ratio)

Melt viscosity of polyester diol/low molecular weight diol mixture (poise, 90° C.): 4

Organic polyisocyanate 4,4'-diphenylmethane diisocyanate

Reaction ratio isocyanate equivalent/total hydroxyl equivalent: 0.95

(Reaction Conditions)

Reaction temperature in extruder: 170° C.

Twin-screw rotational speed: 260 rpm

TABLE 4

|  |  | Polyurethane Resin PU1-1 |  | Polyurethane Resin PU1-2 |  |
|---|---|---|---|---|---|
| Polyester diol A | Acid components (mole ratio) | OPA | 54 | OPA | 96 |
|  |  | IPA | 44 | DSN | 4 |
|  |  | DSN | 2 |  |  |
|  | Glycol components (mole ratio) | NPG | 40 | NPG | 60 |
|  |  | CHDM | 20 | CHDM | 20 |
|  |  | HD | 40 | HD | 20 |
|  | Hydroxyl value (KOH mg/g) |  | 160 |  | 186 |
| Low molecular weight diol B |  | HPN |  | HPN |  |
| Organic polyisocyanate compound D |  | MDI |  | MDI |  |
| Weight ratio A/B/D |  | 100/25/63 |  | 100/20/63 |  |
| Urethane bonding group concentration (eq./$10^6$ g) |  | 2690 |  | 2810 |  |
| Molecular weight of urethane resin formed (Mn) |  | 25000 |  | 27000 |  |
| Glass transition temperature of urethane resin formed (° C.) |  | 90 |  | 95 |  |
| Molecular weight distribution (Mw/Mn) |  | 2.3 |  | 2.2 |  |

Example 7

The composition at the mixing ratio as described below was placed in a ball mill and dispersion was carried out for 48 hours, after which 1 part of stearic acid and 1 part of butyl stearate as lubricants, and 6 parts of an isocyanate compound, Coronate L (Nippon Polyurethane Industry Co., Ltd.) as a hardening agent were added, and dispersion was continued for another 1 hour to give a magnetic coating. The magnetic coating thus obtained was applied onto a polyethylene terephthalate film having a thickness of 12 μm in the magnetic field of 2000 gauss so that the thickness after drying of the magnetic layer came to 4 μm. After aging at 50° C. for 48 hours, the coated film was slit into a width of ½ inch to give a magnetic tape. The characteristics of the magnetic tape are shown in Table 5.

| 30% solution of polyurethane resin PU2-1 | 36 parts |
|---|---|
| MAG 527 solution* | 36 parts |
| Cobalt magnetite** | 100 parts |
| Raven 1255*** | 15 parts |
| Alumina powder**** | 6 parts |
| Cyclohexane | 42 parts |
| Methyl ethyl ketone | 96 parts |
| Toluene | 46 parts |

*30% solution of vinyl chloride copolymer resin (UCC Corp.) in methyl ethyl ketone/toluene (50:50)
**ANB 170HC (Toda Kogyo Corp.)
***Carbon black (Colombian Carbon Corp.)
****Alumina powder KP-20 (Sumitomo Chemical Co., Ltd.)

Example 8

In the same manner as described above in Example 7, except that polyurethane resin PU2-2 was used instead of polyurethane resin PU2-1, a magnetic tape was prepared and then examined for its characteristics. The results are shown in Table 5.

Example 9

In the same manner as described above in Example 7, except that polyurethane resin PU2-2 was only used instead of polyurethane resin PU2-1 without MAG 527, a magnetic tape was prepared and then examined for its characteristics. The results are shown in Table 5.

TABLE 5

|  | Binder resin(s) (weight ratio) | | Gloss (%) | Squareness ratio (%) | Abrasion resistance |
|---|---|---|---|---|---|
| Example 7 | polyurethane resin PU2-1 | 50 | 108 | 84 | 6 |
|  | MAG 527 | 50 |  |  |  |
| Example 8 | polyurethane resin PU2-2 | 50 | 110 | 84 | 6 |
|  | MAG 527 | 50 |  |  |  |
| Example 9 | polyurethane resin PU2-2 | 100 | 118 | 85 | 5 |

The following Preparation Examples for Thermoplastic Polyurethane Resins PU3-1 to PU3-2 and Examples 10–14 will demonstrate the second thermoplastic polyurethane resin of the present invention.

Preparation Example for Thermoplastic Polyurethane Resin PU3-1

From the starting materials as described below, polyester diol A and low molecular weight diol B in molten state were introduced into a twin-screw extruder, and then reacted with organic polyisocyanate compound D. The polyurethane resin in molten state was extruded from the nozzle into a strand form, followed by cooling and subsequent cutting into pellets of solid-type polyurethane resin PU3-1. The characteristics of the resin are shown in Table 6.

(Starting Materials for Polyurethane Resin PU3-1)

Polyester diol A

Composition (mole ratio)

| Acid components: | isophthalic acid | 44 |
|---|---|---|
|  | o-phthalic acid | 44 |
|  | 5-sulfophtharic acid sodium salt | 2 |
|  | adipic acid | 10 |
| Glycol components: | neopentyl glycol | 40 |
|  | 1,4-cyclohexanedimethanol | 20 |
|  | 1,6-hexanediol | 40 |

Hydroxyl value (KOH mg/g): 165
Acid value (KOH mg/g): 0.40
Low molecular weight diol B
2,2-dimethyl-3-hydroxypropyl-2',2'-dimethyl-3'-hydroxypropanol
  Mixing ratio of polyester diol A/low molecular weight diol B: 100/25 (weight ratio)
  Melt viscosity of polyester diol A/low molecular weight diol B mixture (poise, 90° C.): 3
Organic polyisocyanate compound D
4,4'-diphenylmethane diisocyanate
Reaction ratio
isocyanate equivalent of D/total hydroxyl equivalent of A+B: 0.96
(Reaction Conditions)
Reaction temperature in the extruder: 170° C.
Twin-screw rotational speed: 260 rpm Preparation Example for Thermoplastic Polyurethane Resin PU3-2

From the starting materials as described below, polyester diol A, low molecular weight diol B, and polyester diol C1 in molten state were introduced into a twin-screw extruder, and then reacted with organic polyisocyanate compound D. The polyurethane resin in molten state was extruded from the nozzle into a strand form, followed by cooling and subsequent cutting into pellets of solid-type polyurethane resin PU3-2. The characteristics of the resin are shown in Table 6.

(Starting Materials for Polyurethane Resin PU3-2)

Polyester diol A

Composition (mole ratio)

| Acid components: | o-phthalic acid | 96 |
|---|---|---|
|  | 5-sulfophtharic acid sodium salt | 4 |
| Glycol components: | neopentyl glycol | 60 |
|  | 1,4-cyclohexanedimethanol | 20 |
|  | 1,6-hexanediol | 40 |

Hydroxyl value (KOH mg/g): 181
Acid value (KOH mg/g): 0.42
Low molecular weight diol B
2,2-dimethyl-3-hydroxypropyl-2',2'-dimethyl-3'-hydroxypropanol
Polyester diol C1

Composition (mole ratio)

| Acid components: | adipic acid | 100 |
| --- | --- | --- |
| Glycol components: | 1,4-butanediol | 100 |

Hydroxyl value (KOH mg/g): 56

Acid value (KOH mg/g): 0.35

Mixing ratio of polyester diol A/low molecular weight diol B/polyester diol C1: 100/20/30 (weight ratio)

Melt viscosity of polyester diol A/low molecular weight diol B/polyester diol C1 mixture (poise, 90° C.): 7

Organic polyisocyanate compound D 4,4'-diphenylmethane diisocyanate

Reaction ratio isocyanate equivalent of D/total hydroxyl equivalent of A+B+C: 0.95

(Reaction Conditions)

Reaction temperature in the extruder: 170° C.

Twin-screw rotational speed: 260 rpm

TABLE 6

|  |  | Polyurethane Resin PU3-1 |  | Polyurethane Resin PU3-2 |  |
| --- | --- | --- | --- | --- | --- |
| Polyester diol A | Acid components (mole ratio) | OPA | 44 | OPA | 96 |
|  |  | IPA | 44 | DSN | 4 |
|  |  | DSN | 2 |  |  |
|  |  | AA | 10 |  |  |
|  | Glycol components (mole ratio) | NPG | 40 | NPG | 60 |
|  |  | CHDM | 30 | CHDM | 20 |
|  |  | HD | 30 | HD | 20 |
| Low molecular weight diol B |  | HPN |  | HPN |  |
| Polyester diol C1 | Acid components (mole ratio) |  |  | AA | 100 |
|  | Glycol components (mole ratio) |  |  | BD | 100 |
| Organic polyisocyanate compound D |  | MDI |  | MDI |  |
| Weight ratio A/B/C1/D |  | 100/25/—/63 |  | 100/20/30/65 |  |
| Urethane bonding group concentration (eq./10$^6$ g) |  | 2690 |  | 2420 |  |
| Molecular weight of urethane resin formed (Mn) |  | 25000 |  | 27000 |  |
| Glass transition temperature of urethane resin formed (° C.) |  | 62 |  | 65 |  |
| Molecular distribution (Mw/Mn) |  | 2.0 |  | 2.2 |  |

Example 10

The composition at the mixing ratio as described below was placed in a ball mill and dispersion was carried out for 48 hours, after which 1 part of stearic acid and 1 part of butyl stearate as lubricants, 5 parts of alumina powder (mean particle diameter, 0.2 μm) as an abrasive, and 6 parts of an isocyanate compound, Coronate L (Nippon Polyurethane Industry Co., Ltd.) as a hardening agent were added, and dispersion was continued for another 1 hour to give a magnetic coating. The magnetic coating thus obtained was applied onto a polyethylene terephthalate film having a thickness of 12 μm in the magnetic field of 2000 gauss so that the thickness after drying of the magnetic layer came to 4 μm. After aging at 50° C. for 48 hours, the coated film was slit into a width of ½ inch to give a magnetic tape. The characteristics of the magnetic tape are shown in Table 7.

| 30% solution of polyurethane resin PU3-1 | 36 parts |
| --- | --- |
| MAG 527 solution* | 36 parts |
| Cobalt magnetite** | 100 parts |
| Raven 1255*** | 15 parts |
| Cyclohexane | 42 parts |
| Methyl ethyl ketone | 96 parts |
| Toluene | 46 parts |

*30% solution of vinyl chloride copolymer resin (UCC Corp.) in methyl ethyl ketone/toluene (50:50)
**ANB 170HC (Toda Kogyo Corp.)
***Carbon black (Colombian Carbon Corp.)

Example 11

In the same manner as described above in Example 10, except that polyurethane resin PU3-2 was used instead of polyurethane resin PU3-1, a magnetic tape was prepared and then examined for its characteristics. The results are shown in Table 7.

Example 12

In the same manner as described above in Example 10, except that polyurethane resin PU3-2 was used instead of MAG 527, a magnetic tape was prepared and then examined for its characteristics. The results are shown in Table 7.

TABLE 7

|  | Binder resins (weight ratio) |  | Gloss (%) | Square-ness ratio (%) | Abrasion resistance |
| --- | --- | --- | --- | --- | --- |
| Example 10 | Polyurethane resin PU3-1 | 50 | 109 | 83 | 6 |
|  | MAG 527 | 50 |  |  |  |
| Example 11 | Polyurethane resin PU3-2 | 50 | 106 | 83 | 5 |
|  | MAG 527 | 50 |  |  |  |
| Example 12 | Polyurethane resin PU3-1 | 50 | 112 | 85 | 6 |
|  | Polyurethane resin PU3-2 | 50 |  |  |  |

Example 13

Compositions A and B at the mixing ratios as described below were independently placed in a glass vessel and dispersion was carried out with a paint shaker for 6 hours, followed by application onto a polyethylene terephthalate film and subsequent examination for dispersibility.

|  | Comp. A | Comp. B |
| --- | --- | --- |
| 30% solution of polyurethane resin PU3-1 | 5 g | 5 g |
| MAG 527 solution* | 5 g | 5 g |
| Cobalt magnetite** | 13.5 g | 13.5 g |
| Raven 1255*** | — | 2.7 g |
| Cyclohexane | 5.4 g | 6.3 g |
| Methyl ethyl ketone | 10 g | 12.2 g |
| Toluene | 4.6 g | 5.9 g |
| Glass beads | 50 g | 50 g |

*30% solution of vinyl chloride copolymer resin (UCC Corp.) in methyl ethyl ketone/toluene (50:50)
**ANB 170HC (Toda Kogyo Corp.)
***Carbon black (Colombian Carbon Corp.)

Example 14

In the same manner as described above in Example 13, except that polyurethane resin PU3-2 was used instead of polyurethane resin PU3-1, magnetic coating films were prepared and then examined for dispersibility. The results are shown in Table 8.

TABLE 8

| | Binder resins (weight ratio) | | Comp. A Gloss (%) | Comp. B Gloss (%) |
|---|---|---|---|---|
| Example 13 | Polyurethane resin PU3-1 | 50 | 101 | 98 |
| | MAG 527 | 50 | | |
| Example 14 | Polyurethane resin PU3-2 | 50 | 104 | 103 |
| | MAG 527 | 50 | | |

The following Preparation Examples for Thermoplastic Polyurethane Resins PU4-1 to PU4-4 and Examples 15–18 will demonstrate the fourth thermoplastic polyurethane resin of the present invention.

Preparation Examples for Thermoplastic Polyurethane Resins PU4-1 to PU-4-4

Polyester diol A and low molecular weight diol B were mixed in molten state at a mixing ratio of 100:20 (weight ratio), and loaded into an extruder, and reacted with the organic polyisocyanate compound at an isocyanate value/hydroxyl value ratio of 0.98. For the reaction conditions, the internal temperature in the extruder was 180° C. and the screw rotational speed was 200 rpm. The characteristics of polyurethane resins extruded from the nozzle are shown in Table 9.

TABLE 9

| | Polyurethane comp.* (weight ratio) | | | Number average molecular weight ($\times 10^3$) | Glass transition temperature (° C.) | Degree of sublimation (%) |
|---|---|---|---|---|---|---|
| | polyester polyol A | low molecular weight diol B | organic polyiso-cyannate compound | | | |
| Polyurethane resin PU4-1 | polyol A-1 100 | HPN 20 | MDI 52 | 25 | 75 | 0 |
| Polyurethane resin PU4-2 | polyol A-2 100 | HPN 20 | MDI 53 | 30 | 80 | 0 |
| Polyurethane resin PU4-3 | polyol A-3 100 | BD 20 | MDI 51 | 22 | 71 | 0 |
| Polyurethane resin PU4-4 | polyol A-4 100 | MG 20 | MDI 55 | 38 | 35 | 0 |

Polyester polyols A shown in Table 9 have the following composition and number-average molecular weight (Mn).

| Polyol A-1 | OPA/DSN//NPG/CHDM/HD (mole ratio, 96/4//60/20/20) | Mn = 500 |
|---|---|---|
| Polyol A-2 | IPA/DSN//HPN/EG/CHDM (mole ratio, 96/4//75/15/10) | Mn = 600 |
| Polyol A-3 | IPA/CH/DSN//CHDM/HD (mole ratio, 60/36/4//50/30/20) | Mn = 600 |
| Polyol A-4 | OPA/AA/DSN//NPG/HD/CHDM (mole ratio, 56/40/4//60/15/25) | Mn = 500 |

The abbreviations used herein have the same meanings as defined above and the additional ones have the following meanings.
 CH 1,4-cyclohexanedicarboxylic acid
 MG 2-methyl-1,3-propnaediol
The degree of sublimation of low molecular weight diols The weight of a mixture of the polyester polyol and the low molecular weight diol in molten state was measured before and after standing in an oven at 90° C. for 12 hours, and the degree of sublimation was determined by the following equation.

$$\text{Degree of sublimation} = \frac{\text{Initial weight} - \text{Weight after standing at 90° C.}}{\text{Initial weight}}$$

Example 15

The composition at the mixing ratio as described below was placed in a ball mill and dispersion was carried out for 24 hours, after which 1 part of a polyisocyanate compound, Millionate MR (Nippon Polyurethane Industry Co., Ltd.) as a hardening agent, and 0.2 part of stearic acid and 0.2 part of butyl stearate as lubricants were added, and dispersion was continued for another 1 hour to give a magnetic coating. The magnetic coating thus obtained was applied onto a polyethylene terephthalate film having a thickness of 15 μm so that the thickness after drying of the magnetic layer came to 4 μm. The coated film was dried in the magnetic field of 2000 gauss and then passed through a calender roll at 80° C. under a linear pressure of 200 kg/cm for the smoothing treatment of the magnetic layer surface. The magnetic film thus obtained was allowed to stand at 60° C. for one day and then slit into a width of ½ inch to give a magnetic tape. The characteristics of the magnetic tape are shown in Table 10.

| 30% solution of polyurethane resin PU4-1 in a mixture of methyl ethyl ketone and toluene (50:50) | 10 parts |
|---|---|
| Magnetic particles (cobalt-coated ferrite BET 45 m²/g) | 15 parts |
| Cyclohexanone | 8 parts |
| Toluene | 8 parts |
| Methyl ethyl ketone | 8 parts |

Examples 16–18

In the same manner as described above in Example 15, except that polyurethane resins PU4-2 to PU4-4 were each used instead of polyurethane resin PU4-1, magnetic tapes were prepared and then examined for their characteristics. The results are shown in Table 10.

TABLE 10

| | Binder resin(s) (weight ratio) | | Gloss before smoothing (%) | Squareness ratio (%) | Abrasion resistance |
|---|---|---|---|---|---|
| Example 15 | polyurethane resin PU4-1 | 100 | 134 | 88 | 6 |
| Example 16 | polyurethane resin PU4-2 | 100 | 136 | 86 | 5 |
| Example 17 | polyurethane resin PU4-3 MAG 527 | 50 50 | 122 | 85 | 6 |
| Example 18 | polyurethane resin PU4-4 | 100 | 135 | 87 | 4 |

What is claimed is:

1. A thermoplastic resin for use in recording media, comprising the product of the reation in a molten state of a polyester polyol (component A), component A comprising at least one component selected from the group consisting of a sulfuric acid metal salt group containing dicarboxylic acids and a sulfuric acid metal salt group containing glycols, and a low molecular weight diol (component B) having a molecular weight of 500 or lower with an organic diisocyanate compound, said component B being at least one selected from the group consisting of diols having a molecular weight of 200 or higher and diols in liquid form at 20° C., wherein at least 80 mol % of the dicarboxylic acid component of component A is a dicarboxylic acid selected from the group consisting of isophthalic acid, o-phthalic acid, phthalic anhydride, 1-3-cyclohexanedicarboxylic acid, and 1,2-cyclohexanedicarboxylic acid.

* * * * *